United States Patent [19]

Disney

[11] 4,002,878

[45] Jan. 11, 1977

[54] GAS TUNGSTEN ARC WELDING ELECTRODE

[75] Inventor: John A. Disney, Orem, Utah

[73] Assignee: Utah State University Foundation, Logan, Utah

[22] Filed: July 25, 1975

[21] Appl. No.: 599,216

[52] U.S. Cl. .................... 219/121 P; 219/75; 219/121 R; 219/145; 313/231.3
[51] Int. Cl.$^2$ ........................... B23K 9/24
[58] Field of Search .......... 219/121 P, 121 R, 74, 219/75, 76, 145; 313/231.3

[56] References Cited
UNITED STATES PATENTS

| | | | |
|---|---|---|---|
| 3,027,446 | 3/1962 | Browning | 219/75 |
| 3,076,085 | 1/1963 | Sundstrom | 219/75 |
| 3,131,288 | 4/1964 | Browning | 219/121 P |
| 3,246,115 | 4/1966 | Johnson | 219/121 P |
| 3,343,027 | 9/1967 | Frohlich | 313/231.3 |
| 3,471,675 | 10/1969 | Sargent et al. | 219/75 |
| 3,569,661 | 3/1971 | Ebeling, Jr. et al. | 219/121 P |
| 3,676,639 | 7/1972 | Esiban et al. | 219/75 X |
| 3,780,259 | 12/1973 | Meyer | 219/75 X |

*Primary Examiner*—J. V. Truhe
*Assistant Examiner*—N. D. Herkamp
*Attorney, Agent, or Firm*—H. Ross Workman; J. Winslow Young

[57] ABSTRACT

An improved electrode and electrode working tip for a gas tungsten arc welding apparatus. The face of the working tip of the electrode is formed as a narrow ring coaxial with the electrode and having an area less than the area of electron emission for the operating currents of the electrode. The reduced area of the narrow annular ring forces the area of electron emission to spread to the immediately adjacent walls. The improved electrode working tip provides a more stable and uniform plasma of reduced diameter for improved precision and repeatability in welds which is the ability to consistently reproduce welding parameters. The electrode tip also has a significantly increased working life.

11 Claims, 3 Drawing Figures

GAS TUNGSTEN ARC WELDING ELECTRODE

BACKGROUND

1. Field of the Invention

This invention relates to electrodes for gas tungsten arc welding apparatus.

2. The Prior Art

The gas tungsten arc welding or GTAW apparatus is well-known in the industry and is used for high temperature, precision welding particularly in automated welding systems. The GTAW apparatus contains a nonconsumable electrode and generally operates on direct current power applied to the electrode. The polarity is usually electrode negative (Direct Current Straight Polarity, or DCSP, as commonly referred to in the trade). In operation, an electric arc is formed between the working tip of the electrode and the metal workpiece. The electrode is fabricated from tungsten or an alloy of tungsten in order to withstand the high temperatures involved.

The electrode is concentric within a ceramic gas shield which directs a flow of gas around the electric arc. The arc ionizes the gas through which it passes to create a high temperature plasma for welding. The gas, an inert gas such a helium or argon, serves (1) to create the plasma by being ionized by the electric arc and (2) shields the molten metal at the weld site from reaction with gases in the atmosphere.

Each electrode composition has a given electron density (P) which must be obtained before the electrons will leave the surface of the electrode to form the arc. The area from which the electrons leave the electrode surface is the area of electron emission (A). The relationship between the electron density (P), the area of emission (A) and the current (I) applied to the electrode may be stated as: $P = I/A$. Since P is a constant value for a given electrode composition, an increase in (I) will correspondingly increase (A). However, each electrode composition also has a maximum continuous operating current above which electrode failure will occur. If the working tip of a cylindrical electrode were the flat, circular face at the end of the electrode, the area of the circular face would be considerably greater than the maximum area of electron emission (A) that could be obtained at the maximum continuous current (I) that could be applied to the electrode. Accordingly, the resulting plasma would be emitted from only a fraction of the area of the circle and would tend to skip erratically over the face of the circle resulting in an unstable plasma and a low repeatability of weld accuracy. It has, therefore, been the accepted practice to localize the area of electron emission for the plasma by reducing the surface area available for electron emission. This is done by shaping the working tip of the electrode as a cone. The conical point may range between blunt and sharp. However, the conical point is generally formed as a sharp, 30° to 120° right circular cone. Although the sharp point is preferred for most applications, a blunt configuration such as a semispherical tip is used for AC operation, generally on aluminum, and some DC operations.

Although the electrode is not directly consumed in the welding process, the tip is subjected to erosion, contamination, and wear requiring periodic reworking and, ultimately, replacement of the electrode. Tip erosion appears to result from heating of the apex of the cone and from electron erosion along the grind lines of all but the most carefully prepared tips. Contamination of the working tip results from sputtering of or contact with the weld metal.

A useful discussion of conical tip geometry may be found in *Welding Research Supplement*, "The Effect of Electrode Welding," W. F. Savage, et. al., November 1965, pages 489-s to page 496-s.

The electron stream or plasma formed from a conical tip results in a "bell" shaped plasma. Specifically, the portion of the plasma emitted from the apex of the cone travels directly to the metal being heated. The electrons emitted from the cone surface adjacent the apex of the cone are emitted perpendicular to the cone surface and are thereafter magnetically attracted by the plasma to the remainder of the electron stream. This phenomenon of being emitted perpendicularly from the surface of the cone and then being drawn to the main body of the electron stream creates the upper curved surface or shoulder of the bell shape. At the metal surface, countercurrently flowing ions in the plasma cause the plasma to flare outwardly thereby creating the expanded periphery or lip of the bell-shaped plasma.

At low amperages, the bell-shaped plasma has poor temperature uniformity and is relatively uncontrollable. This results in erratic heating characteristics of the metal and, consequently, a low rate of repeatability or reproducibility of the welding process. Even at higher amperages it has been found that the bell-shaped plasma is readily deflected by air currents and pivots about the conical tip of the electrode. Furthermore, due to the girth of the bell-shaped plasma, the working tip of the electrode must be extended beyond the confines of the ceramic gas shield to prevent interference between the plasma and the shield.

Increased electrode life and restarts has been obtained by incorporating a coaxial, cylindrical, blind bore in the flat end of an electrode, for example, see U.S. Pat. No. 3,780,259. This patent provides for a coaxial blind bore with the diameter of the bore being between 25 and 50 percent of the electrode so that the face of the working tip is a broad, flat, annular surface. The area of electron emission on this annular surface, using the formula $P = I/A$, is an area less than the area of the broad annular face. It is not possible for the area of electron emission, (A), to encompass all of the foregoing broad annular face without exceeding the current limitations, (I), of the electrode. A greater number of restarts have been obtained because of the large surface area of the face available for electron emission. As one portion of the face becomes contaminated the area of electron emission merely shifts to an uncontaminated portion of the face. Furthermore, the plasma is also easily deflected by air currents and the like thereby having a tendency to be a very unstable plasma.

In view of the foregoing, it would be a significant advancement in the art of gas tungsten arc welding electrodes to provide an electrode which is configurated to emit a controlled and stable plasma. In particular, it would be advantageous to provide an electrode having an extended life and which emits a more stable and constricted plasma thereby permitting a greater reproducibility of results. Such an invention is disclosed herein.

BRIEF SUMMARY AND OBJECTS OF THE INVENTION

The present invention is a novel electrode configuration for a gas tungsten arc welding apparatus wherein the face of the working tip of the electrode is a narrow annular ring coaxial with the electrode. The area of the narrow annular ring is at least equal to or, preferably, less than the area of electron emission. The ring is formed around a coaxial hollow which may be a throughbore or a recess. A portion of the electron stream is emitted from both the external and internal wall surfaces adjacent the ring thereby providing an anchoring of the plasma. The resulting plasma also has a more uniform temperature distribution over a wider current range and a constricted shape.

It is therefore a primary object of this invention to provide improvements in electrodes for gas tungsten arc welding processes.

A further object of this invention is to provide a method for improving the plasma formed by a gas tungsten arc welding apparatus.

An even further object of this invention is to provide an improved electrode for a gas tungsten arc welding apparatus wherein the face of the working tip of the electrode is a narrow annular ring concentric about the axis of the electrode.

Another object of this invention is to provide an electrode for a gas tungsten arc welding apparatus wherein a portion of the plasma is emitted from internal and external wall surfaces adjacent the narrow annular ring at the electrode tip.

These and other objects and features of the present invention will become more fully apparent from the following description and appended claims taken in conjunction with the accompanying drawing.

DETAILED DESCRIPTION OF THE PREFERRED EMBODIMENTS

Figure 1:
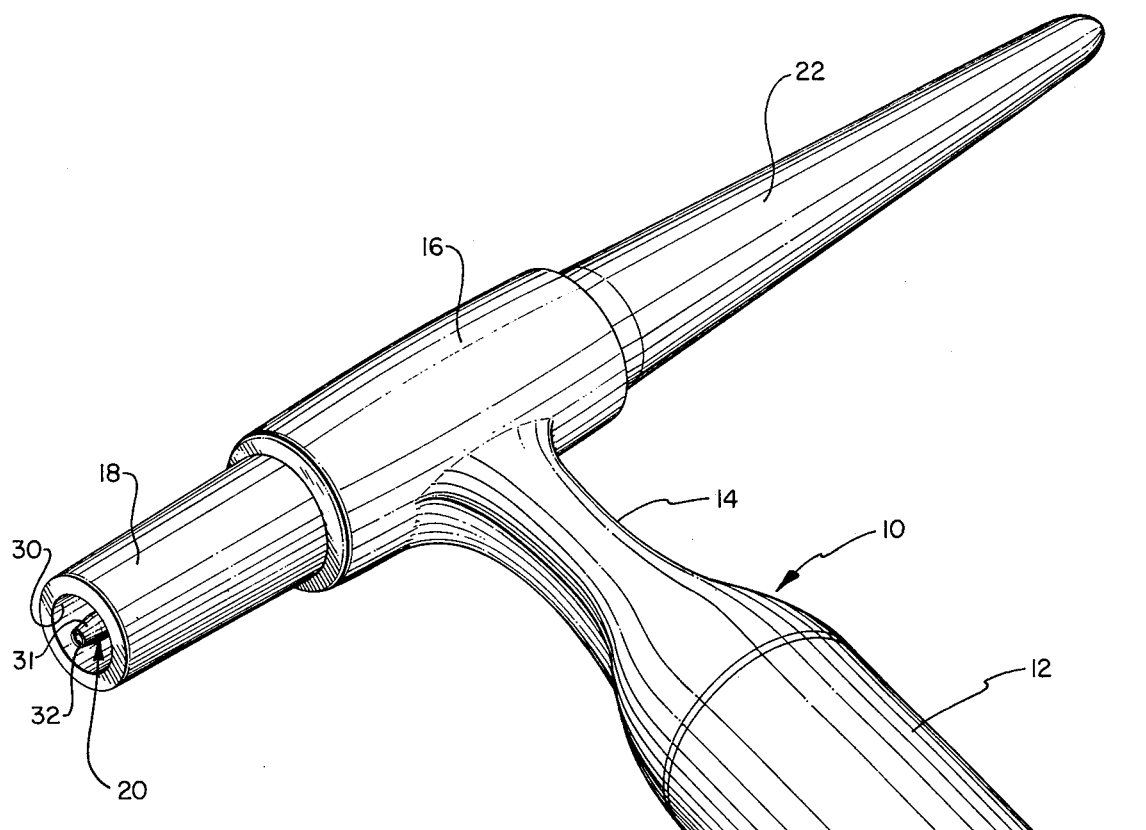
FIG. 1 is a perspective illustration of one presently preferred embodiment of the novel electrode of this invention in the environment of a torch of a gas tungsten arc welding apparatus.

The invention is best understood by reference to the drawing wherein like parts are designated with like numerals throughout.

THE EMBODIMENT OF FIGS. 1 AND 2

Figure 2:
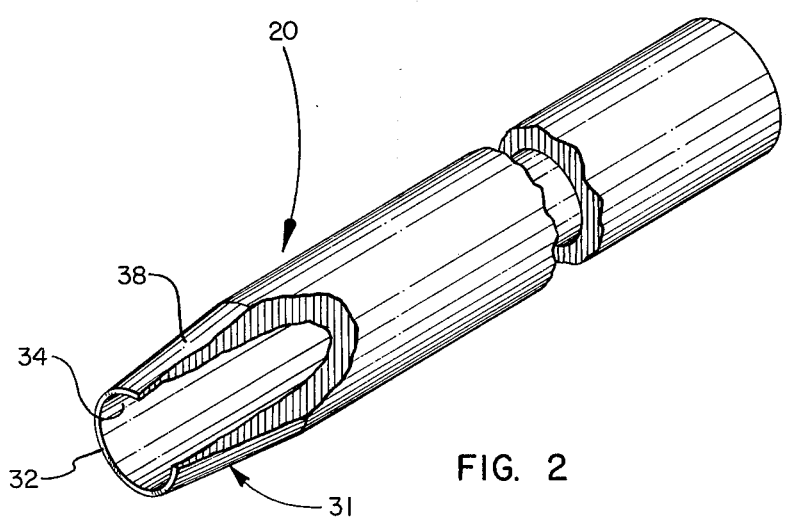
FIG. 2 is an enlarged perspective illustration of the preferred electrode configuration of FIG. 1.

Referring now to one preferred electrode embodiment illustrated in FIGS. 1 and 2, a torch of a conventional gas tungsten arc welding torch is shown generally at 10 and includes a handle 12 broken away to reveal internal components. Torch 10 is connected by a neck 14 to a torch head 16. A cylindrical ceramic gas shield 18 is attached to the forward end of head 16 and has an electrode 20 coaxially disposed therein. A more detailed discussion of electrode 20 will be set forth with particular reference to FIG. 2. A cap 22 is attached to torch head 16 at the end opposite of gas shield 18 and serves as a housing for that reserve portion of electrode 20 which extends beyond the back of head 16.

Located interiorly of handle 12 are the electrical power supply, cooling water, and inert gas flow conduits. For example, conduit 24 receives cooling water as indicated by a flow arrow 25 and exhausted cooling water, flow arrow 29, is conducted away from head 16 through conduit 28. Electrical power to the electrode 20 is supplied through an electrical conduit (not shown) generally located in conjunction with the conduit 28. Inert gas, flow arrow 27, is received through conduit 26. The inert gas is introduced in the annular space 30 between electrode 20 and cup 18 to shield the plasma (not shown) formed from tip 31 of electrode 20.

Referring now more particularly to FIG. 2, a presently preferred embodiment of electrode 20 is shown greatly enlarged and foreshortened for purposes of illustration. A portion of electrode 20 and tip 31 is broken away to reveal the relationship between a cylindrical throughbore 34 and frusto-conical taper 38.

Narrow annular ring 32 is formed between taper 38 and throughbore 34 and has an area significantly less than the area of electron emission, (A), for the maximum current, (I), that can be applied to the electrode. This area of electron emission is easily obtained over a relatively broad current range without exceeding the current limitations of the electrode. In this manner, the area of electron emission is easily forced onto the surfaces of taper 38 and throughbore 34 adjacent ring 32 so as to produce the stable plasma of this invention. Preferentially, a greater portion of the plasma is emitted from the inner surface (throughbore 34) than the outer surface (taper 38) as will be shown more particularly with reference to the embodiment of FIG. 3.

Electrode 20 may be configured with a blind bore (see electrode 50, FIG. 3) although it is preferably fabricated with a cylindrical throughbore 34. Since electrode 20 is essentially tubular, it may be readily fabricated by conventional techniques, for example, powder metallurgy. Other fabrication techniques may prove more difficult since tungsten and its alloys are known for their refractory characteristics. Periodic reworking of working tip 31, which would ultimately be required even with the present improvement is simply a matter of reshaping taper 38 so as to suitably reform narrow annular ring 32.

Figure 3:
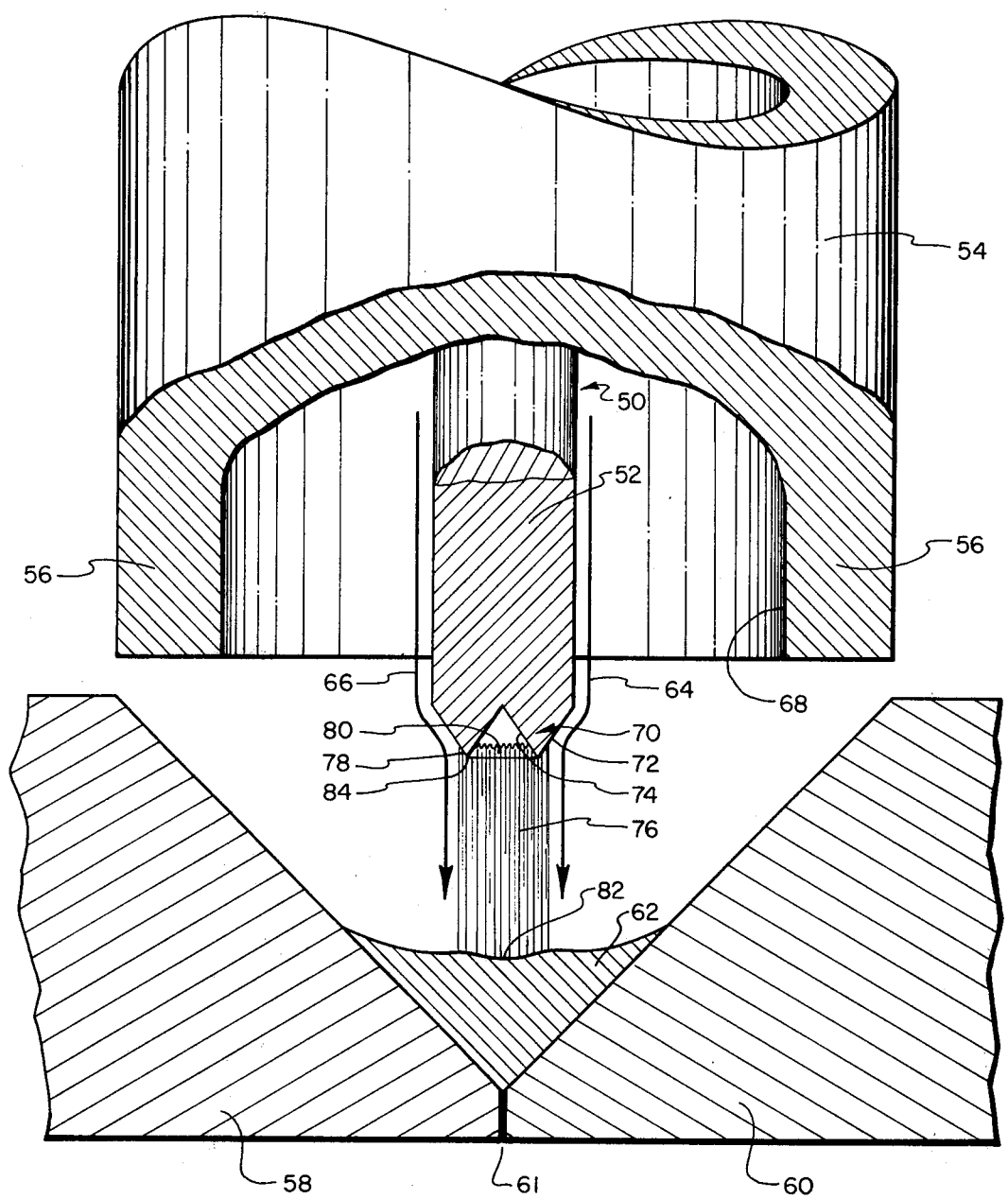
FIG. 3 is a partial and enlarged cross section of another preferred embodiment of the electrode tip of this invention.

The Embodiment of FIG. 3

Referring now more particularly to FIG. 3, a second preferred embodiment of the working tip 70 of an electrode 50 is shown. The electrode 50 has a cross sectional cutout 52 therein to more clearly demonstrate the novel features of this second preferred embodiment. A puddle of molten metal 62 represents a root pass for a welding operation preparatory to building the weld for a butt weld between pipes 58 and 60 at their point of contact 61. Clearly, other welding operations may advantageously be performed with this invention, the presently illustrated operation being shown for ease of explanation.

The electrode 50 is contained within a conventional ceramic gas shield 54 comparable to gas shield 18 (FIG. 1). Gas shield 54 is cut away at 56 to more clearly reveal the electrode 50 and cutout 52. The annular space 68 of gas shield 54 surrounding tip 70 confines the inert gas flow around the electrode 50 with specific gas flow adjacent tip 70 shown as gas flow arrows 64 and 66, the function of which will be discussed more fully hereinafter.

Tip 70 has an outer frusto-conical taper 72 and an inner conical surface 74 both of which surfaces intersect to form a narrow annular ring 84. The application of electrical energy to electrode 50 results in the development of plasma 76 between tip 70 and the metal 62. Since the area of the narrow annular ring 84 is smaller than the area of emission of the electrons that make up plasma 76, a portion of the area of emission will be forced to spread to an adjacent outer surface 78 and also an adjacent inner surface 80 to thereby constrict and stabilize plasma 76.

It is preferred that the area of inner surface 80 be greater than the area of surface 78. It is currently believed that this preferred area differential is caused by the flowing electrons in plasma 76 creating a magnetic field surrounding the electron stream. This magnetic field exerts a constrictive action on plasma 76 to thereby encourage plasma 76 to be emitted from a greater area at surface 80 within the cone than the area outside at surface 78.

In addition to an improved constriction of the plasma, electron emission or "firing" from the internal and external surfaces advantageously and surprisingly anchors the plasma to the tip. This anchored plasma is more difficult to deflect and thereby contributes surprisingly to the ability of this invention to considerably reproduce welding parameters which provides significantly increased repeatability of welds.

The laminar flow of the inert gas adjacent tip 70, flow arrows 64 and 66, also exerts a constrictive action on plasma 76. The tapered shape of surface 72 serves to bring the gas flow inwardly toward the axis of plasma 76 and thereby mechanically restrict the circumference of plasma 76. The gas flow pattern developed by the shape of tip 70 also beneficially serves to create a dimple 82 in the molten metal 62 and cause the metal to preferentially flow in the desired direction to enhance welding control.

Electrode 20 (FIGS. 1 and 2) may be substituted for electrode 50 (FIG. 3) and essentially the same operating description would apply. The greatly constricted girth of the plasma of both embodiments of this invention permits the electrode to be withdrawn and recessed within the protective confines of the gas shield (gas shield 18, FIG. 1, and gas shield 54, FIG. 3) thereby minimizing the chances for accidental contact and contamination of the electrode working tip.

The Method

The method of this invention includes using the improved electrode in place of a conventional electrode to provide a more stable, anchored plasma having a more uniform current density and reduced plasma diameter thereby significantly increasing repeatability of welds.

In practicing the method of this invention, electrode 20 (FIG. 1) is obtained as a hollow cylinder having a throughbore 34. Electrode 50 (FIG. 3) may be internally machined with an electron discharge machine to create recess 74. Although either embodiment of the working tip of this invention may be used with outstanding results, the reshaping requirements would indicate a preference for the electrode embodiment of FIGS. 1 and 2, particularly since the electrode embodiment of FIG. 3 would concurrently require reshaping of recess 74.

It has been previously calculated that a current density of approximately 155,000 amps/square inch is required in order to develop a suitable plasma. Using this as a basis and knowing the external diameter of the electrode tip it is possible to calculate the area of emission for an annular working tip. Importantly, the narrow annular ring of the working tip of each of the electrode embodiments of this invention has an area at least equal to or, preferably, less than the area of electron emission for the operating current range of the electrode. This narrow ring area is selectively less than the area of electron emission to force the area of emission to spread to the wall surfaces adjacent the narrow annular ring. In any of the embodiments of this invention the area of the narrow annular ring on the face of the working tip is an area significantly less than a wide ring having an inside diameter which is 50% of the diameter of the electrode.

The formation of a narrow annular ring at the working tip of the electrode causes the plasma to be more stable and also to be firmly anchored to the tip because the area of electron emission is forced onto the walls adjacent the ring. A more constricted plasma also permits withdrawal of the electrode further into the confines of the gas shield thereby reducing the chances for accidental contact between the electrode and another object.

Operating a gas tungsten arc welding apparatus using an electrode configurated according to the disclosed embodiments of this invention enhances the repeatability of welds obtained thereby. This is possible since the plasma is more securely anchored to the working tip and less susceptible to deflection. Furthermore, the plasma is constricted giving it a more uniform temperature distribution over a broader range of operating currents.

The invention may be embodied in other specific forms without departing from its spirit or essential characteristics. The described embodiments are to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. An electrode for use in an inert gas arc welding apparatus having an electrode supplied with power to form a welding arc plasma, the face of the working tip of the electrode comprising a narrow annular ring, the center of the narrow ring being coincident with the axis of the electrode, the surface area of the narrow ring being less than an annular surface formed between a first diameter and a second diameter, the first diameter being equal to 50% of the diameter of the electrode and the second diameter being equal to the diameter of the electrode, the surface area of the narrow annular ring being less than the area of electron emission for the plasma without exceeding the current limitation for the electrode thereby forcing the area of electron emission for the plasma to spread to electrode surface area adjacent the narrow annular ring.

2. An electrode as defined in claim 1 wherein the narrow annular ring is formed between an external frustoconical taper at the working tip and a coaxial hollow.

3. An electrode as defined in claim 2 wherein the hollow is a throughbore.

4. An electrode as defined in claim 2 wherein the hollow is a recess.

5. An electrode as defined in claim 4 wherein the recess is conical.

6. An improved electrode for a gas tungsten arc welding process comprising a tubular electrode having a narrow annular ring at the working tip, the ring being formed between the hollow throughbore of the tubular electrode and an external taper at the working tip, the narrow annular ring having an area less than the area of electron emission at the current limitation of the electrode thereby forcing the area of electron emission to include electrode surface area on the working tip adjacent the narrow annular ring.

7. An improved electrode tip for an electrode for a gas tungsten arc welding process comprising a working tip having a narrow annular ring formed between an external taper and a coaxial internal taper, the narrow annular ring having an area less than the area of electron emission at the current limitation of the electrode thereby forcing the area of electron emission to include electrode surface area on the working tip adjacent the narrow annular ring.

8. A method for providing an anchored, more stable plasma for an inert gas arc welding apparatus comprising the steps of:
forming a working tip on the electrode comprising a narrow annular ring having a center coincident with the axis of the electrode, the surface area of the narrow annular ring being less than the area of electron emission for the plasma without exceeding the current limitation for the electrode thereby forcing the area of electron emission for the plasma to spread to electrode surface area adjacent the narrow annular ring;
shielding the working tip with a flow of inert gas;
placing the working tip in proximity to a metal workpiece; and
imposing an electrical current on the electrode to force electrons to flow between both the narrow annular ring and adjacent electrode wall surfaces and the metal workpiece, the flowing electrons ionizing the gas and thereby forming a plasma, the narrow annular ring accommodating anchoring and stabilizing the plasma at the tip.

9. An improved working tip for a nonconsumable electrode comprising a narrow annular ring on the face of the working tip, the ring being formed adjacent the circle of intersection of a taper with the face, the narrow annular ring having an area less than the area of electron emission at the current limitation of the electrode thereby forcing the area of electron emission to include electrode surface area on the working tip adjacent the narrow annular ring.

10. An improved working tip as defined in claim 9 wherein the taper is an internal taper.

11. An improved working tip as defined in claim 10 wherein the taper is an external taper.

* * * * *